July 1, 1930. G. L. DANFORTH, JR 1,769,211
METALLURGICAL FURNACE AND PORT CONSTRUCTION
Filed Feb. 2, 1922
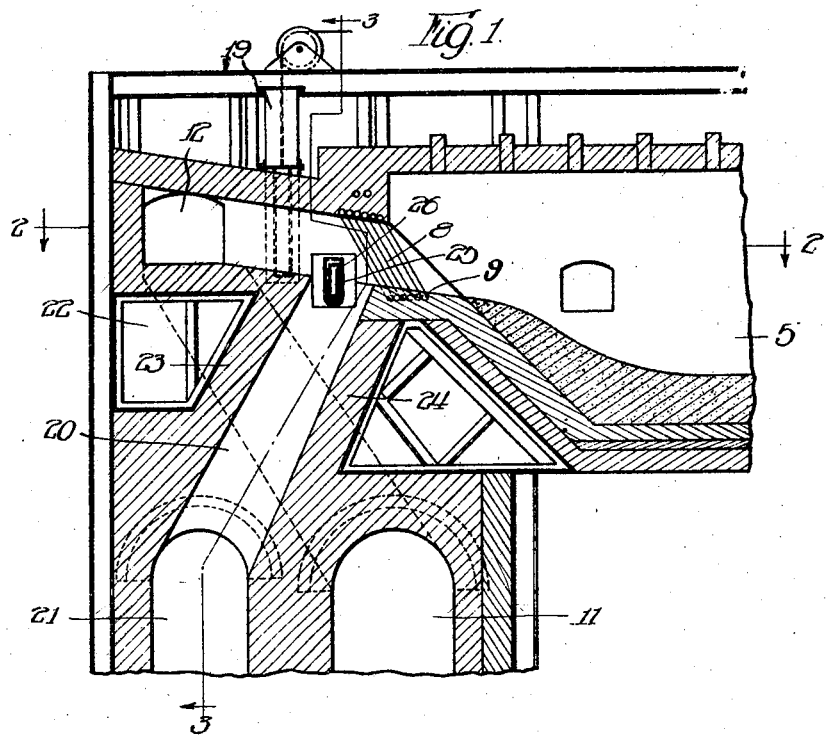
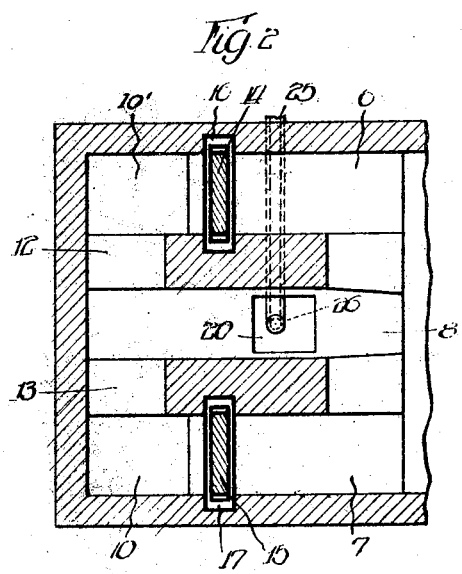
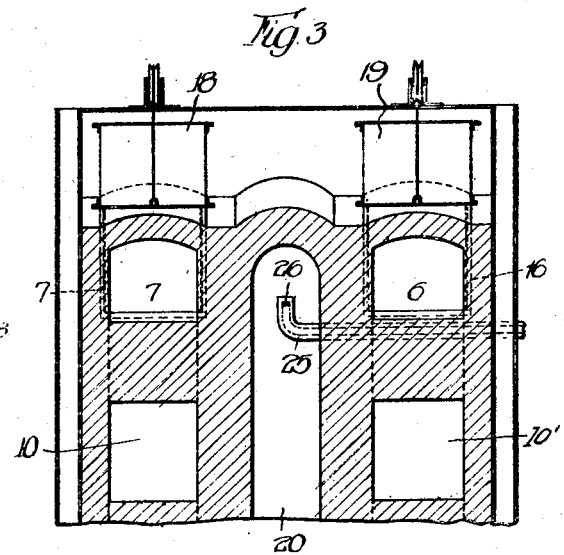
Witness:
R. Burkhardt
Inventor:
George L. Danforth Jr,
By L. Anthony
Atty Patented July 1, 1930

1,769,211

UNITED STATES PATENT OFFICE

GEORGE L. DANFORTH, JR., OF CHICAGO, ILLINOIS, ASSIGNOR, BY MESNE ASSIGNMENTS, TO OPEN HEARTH COMBUSTION COMPANY, OF CHICAGO, ILLINOIS, A CORPORATION OF DELAWARE

METALLURGICAL FURNACE AND PORT CONSTRUCTION

Application filed February 2, 1922. Serial No. 533,570.

This invention relates to a new and improved metallurgical furnace and port construction and more particularly to furnaces of that type in which the effective port area is varied upon the incoming and outgoing ends of the furnace.

As is well known in the art, in a regenerative metallurgical furnace such as open hearth furnaces, the fuel and air are introduced at one end of the furnace and the products of combustion pass out at the opposite end. The operation of a furnace is, however, periodically reversed so that each end serves in turn as an incoming and as an outgoing end. Since the products of combustion materially exceed in volume the incoming air and fuel, the port area required is largely governed by the necessities of the outgoing end. This has resulted in the use of ports of such size and design as to fail to adequately control and direct the incoming air and fuel.

In the endeavor to obviate these difficulties, certain types of furnaces have been designed as, for example, that in the patent to McKune, No. 1,339,855, issued May 11, 1920, in which supplemental passages are provided for use upon the outgoing end. The present invention relates to an improvement on such types of furnaces.

In furnaces of a regenerative type, it is difficult to prevent wear and erosion upon the walls of the ports and uptakes due to the excessive heat and the velocity of the products of combustion. Attempts are made to limit this erosion by cooling the walls, but such cooling requires very large quantities of water and presents structural difficulties. According to my invention, the walls of such passages are as far as possible cooled directly by the exterior air, the passages being formed adjacent the outer walls of the furnace.

It is an object of the present invention to provide a new and improved port construction in which are provided lateral uptakes for air located upon either side of the central port and communicating therewith.

It is a further object to provide such a construction in which the uptakes are connected directly to the furnace chamber by means of passages located laterally of the air and fuel port, these passages being controlled by dampers.

It is also an object to provide a construction in which the several uptakes are located adjacent exterior walls of the furnace in such a manner that the uptake walls may be cooled by the exterior air.

Other and further objects will appear as the description proceeds.

I have illustrated a preferred embodiment of my construction in the accompanying drawings in which—

Figure 1 is a vertical section showing an end of the furnace constructed according to the present invention;

Figure 2 is a section taken on line 2—2 of Figure 1; and

Figure 3 is a section taken on line 3—3 of Figure 1.

Referring now to the drawings, the furnace as shown comprises the melting chamber 5 into which enter the lateral passages 6 and 7 and the central port 8. As shown in Figure 1, the port 8 is water-cooled by pipes 9, the side passages 6 and 7 connecting with uptakes 10 and 10' both of which lead into the slag pocket 11 as best shown in Figure 1. These uptakes at their upper ends are cross-connected through openings 12 and 13 to the rear of the central port 8.

The side passages 6 and 7 are controlled by dampers 14 and 15 which, as clearly shown in the drawings, are vertically adjustable in water-cooled guideways 16 and 17. The dampers in their upper positions are enclosed in hoods 18 and 19.

The gas uptake 20 leads from the gas slag pocket 21 to the central port 8 at a point in advance of the entrances into that port from the lateral uptakes. The outer furnace wall in the rear of the uptake 20 is inwardly recessed at 22 so that the wall 23 of the uptake is directly exposed to the outer air. The opposite wall 24 of the uptake is also exposed to an air chamber as shown.

The water-cooled pipe 25 is introduced from the side of the furnace, its nozzle 26 being located as shown in Figure 1 approximately at the point of junction of the gas uptake and the port 8.

In the operation of my improved furnace, upon the incoming end the dampers 14 and 15 are lowered to close off the lateral passages 6 and 7. The preheated air comes from suitable checker chambers to the slag pocket 11 and thence upwardly through uptakes 10 and 10' and into the rear of the port 8 through openings 12 and 13. The preheated gas, if a gas fuel such as is adapted for preheating is used, passes from the slag pocket 21 up the uptake 20 to the port 8 and there intermingles with the preheated air and enters the furnace to form a properly directed flame. Due to the forwardly inclined direction of the gas uptake the air and gas streams meet at an acute angle. Should it be desired to use liquid fuel or gaseous fuels not adapted for preheating, such fuels may be introduced through the pipe 25 and nozzle 26, the gas regenerative chambers and passages then being used for a portion of the air supply.

Upon the outgoing end of the furnace, the dampers 14 and 15 are raised to clear the passages 6 and 7 and the products of combustion may pass directly through these passages to the uptakes 10 and 10' and thence through the slag pocket to the regenerators. A certain portion of the products of combustion will, of course, enter the central port 8, part of them passing down the gas uptake 20 and serving to heat the gas regenerators. The products of combustion passing beyond the opening of the uptake 20 into the port 8 will pass through openings 12 and 13 to the uptakes 10 and 10'.

My furnace offers upon the incoming end a port properly designed to adequately control and direct the flame and upon the outgoing end it offers free passage to the products of combustion. The furnace is adapted for use with any gaseous or liquid fuel and may be quickly changed from one to the other. Although diagonally extending uptakes are utilized, the furnace is so designed that the uptake walls are air cooled, which is an important factor in the life of the furnace.

The construction shown is to be understood as illustrative only and I reserve the right to such modification as comes within the spirit and scope of the appended claims.

I claim:

1. In a regenerative furnace, a pair of spaced air uptakes at each end of said furnace, a combined air and fuel port located intermediate said uptakes, the uptakes being connected to the port, and an intermediate uptake extending between the air uptakes to the port and inclined forwardly toward the furnace chamber.

2. In a regenerative furnace, a pair of spaced air uptakes at each end of said furnace, a combined air and fuel port located intermediate said uptakes, the uptakes being connected to the port, and an intermediate uptake extending between the air uptakes to the port and inclined forwardly toward the furnace chamber, the rear wall of the intermediate uptake forming a recessed portion of the outer furnace wall.

3. In a regenerative furnace, a pair of spaced air uptakes at each end of said furnace, a combined air and fuel port located intermediate said uptakes, the uptakes being connected to the port, and an intermediate uptake extending between the air uptakes to the port and inclined forwardly toward the furnace chamber, said intermediate uptake entering the port in advance of the connection of the air uptakes to the port.

4. In a regenerative furnace, a pair of spaced air uptakes at each end of said furnace, a combined air and fuel port located intermediate said uptakes, the uptakes being connected to the port, and an intermediate uptake extending between the air uptakes to the port and inclined forwardly toward the furnace chamber, the air uptakes laterally joining the port and the intermediate uptake entering the port from below.

5. In a regenerative furnace, a pair of spaced air uptakes at each end of said furnace, a combined air and fuel port located intermediate said uptakes, the uptakes being connected to the port, and an intermediate uptake extending between the air uptakes to the port and inclined forwardly toward the furnace chamber, the air uptakes laterally joining the port and the intermediate uptake entering the port from below in advance of the junction of the air uptakes therewith.

6. In a regenerative furnace, a pair of spaced air uptakes at each end of said furnace, a combined air and fuel port located intermediate said uptakes, the uptakes being connected to the port, an intermediate uptake extending between the air uptakes to the port and inclined forwardly toward the furnace chamber, and a fuel conduit extending into the port.

7. In a regenerative furnace, a pair of spaced air uptakes at each end of said furnace, a combined air and fuel port located intermediate said uptakes, the uptakes being connected to the port, an intermediate uptake extending between the air uptakes to the port and inclined forwardly toward the furnace chamber, the air uptakes laterally joining the port and the intermediate uptake entering the port from below in advance of the junction of the air uptakes therewith, and a fuel conduit extending into the port adjacent the point of entrance of the intermediate uptake into the port.

8. In a regenerative furnace, a pair of spaced air uptakes at each end of said furnace, a combined air and fuel port located intermediate said uptakes, the uptakes being connected to the port, passages connecting the uptakes with the furnace chamber, and dampers controlling said passages.

9. In a regenerative furnace, a pair of spaced air uptakes at each end of said furnace, a combined air and fuel port located intermediate said uptakes, the uptakes being connected to the port, passages extending beside the port and connecting the uptakes with the furnace chamber, and dampers in said passages.

10. In a regenerative furnace, a central port leading to the furnace, means for forcing regenerated air through said port, a slag pocket communicating with said port, a second slag pocket beyond said first-mentioned slag pocket, a passage for fuel connecting said second slag pocket and the under side of said port, an auxiliary flue on each side of said central port connecting the first-mentioned slag pocket with the furnace and acting as an out flue on the out-end of the furnace and means for closing said auxiliary flues on the in-end of the furnace.

11. A regenerative open hearth furnace having a combined air and gas port at each end thereof and air ports at each side of said combined air and gas ports, gas uptake flues for said combined air and gas ports, air uptakes flues for said air ports, and auxiliary airways leading from said air uptake flues to said gas uptake flues to provide a combined air and gas supply to said combined air and gas ports.

Signed at Chicago, Illinois, this 14th day of January, 1922.

GEORGE L. DANFORTH, Jr.